United States Patent
Ohnishi et al.

(10) Patent No.: US 9,728,979 B2
(45) Date of Patent: Aug. 8, 2017

(54) CONTACTLESS POWER TRANSMISSION CIRCUIT

(71) Applicant: TDK CORPORATION, Tokyo (JP)

(72) Inventors: Masahide Ohnishi, Tokyo (JP); Takeshi Kamono, Tokyo (JP)

(73) Assignee: TDK CORPORATION, Tokyo (JP)

( * ) Notice: Subject to any disclaimer, the term of this patent is extended or adjusted under 35 U.S.C. 154(b) by 463 days.

(21) Appl. No.: 14/555,188

(22) Filed: Nov. 26, 2014

(65) Prior Publication Data
US 2015/0145346 A1    May 28, 2015

(30) Foreign Application Priority Data

Nov. 28, 2013 (JP) .................. 2013-246456
Oct. 17, 2014 (JP) .................. 2014-212679

(51) Int. Cl.
*H02J 5/00* (2016.01)
*H01F 38/14* (2006.01)

(52) U.S. Cl.
CPC .............. *H02J 5/005* (2013.01); *H01F 38/14* (2013.01)

(58) Field of Classification Search
CPC ...................................... H02J 5/005
USPC .......................................... 307/104
See application file for complete search history.

(56) References Cited

U.S. PATENT DOCUMENTS

| | | | |
|---|---|---|---|
| 2009/0261778 A1 | 10/2009 | Kook | |
| 2013/0293192 A1* | 11/2013 | Abe | B60L 11/123 320/108 |

FOREIGN PATENT DOCUMENTS

| | | |
|---|---|---|
| CN | 101147308 A | 3/2008 |
| CN | 201383755 Y | 1/2010 |
| JP | A-2013-183497 | 9/2013 |

* cited by examiner

*Primary Examiner* — Joseph Chang
(74) *Attorney, Agent, or Firm* — Oliff PLC

(57) ABSTRACT

The present invention provides a contactless power transmission circuit which is capable of narrowing a fluctuation extent of an output voltage output by a power receiving coil via a rectifier circuit. The contactless power transmission circuit controls a period of an alternating voltage output from a driving circuit based on a smaller one of either of a first command value and a second command value. Here, the first command value is one based on a difference between a detected value of the output voltage from the rectifier circuit and a target value. The second command value is one calculated based on a difference between a detected value of a transmission current flowing through the power transmitting coil and a target value.

10 Claims, 2 Drawing Sheets

CONTACTLESS POWER TRANSMISSION CIRCUIT

The present invention relates to a contactless power transmission circuit for transmitting the power in a non-contact manner.

BACKGROUND

In recent years, the contactless power transmission technology is attracting attentions, with which the power is transmitted from a power-transmitting side to a power-receiving side in a non-contact manner. For example, a power transmission system using the contactless power transmission technology has been disclosed in Patent Document 1. In this power transmission system, when the positional relationship between the power-transmitting side and the power-receiving side is changed, i.e., when the coupling coefficient between the coil on the power-transmitting side (the antenna on the power-transmitting side) and the coil on the power-receiving side (the antenna on the power-receiving side) is changed, the operation of a DCDC converter (a Buck-Boost portion) connected to the coil on the power-receiving side (the antenna on the power-receiving side) via a rectifier portion is controlled so that the charging efficiency of a battery is improved. Thus, if the operation of the DCDC converter (the Buck-Boost portion) is controlled, the optimum charging voltage can be supplied to the battery even if the voltage output from the rectifier portion is changed.

Patent Document

Patent Document 1: JP-A-2013-183497

However, when the fluctuation extent of the voltage output from the rectifier portion becomes larger due to the position deviation between the coil on the power-transmitting side (the antenna on the power-transmitting side) and the coil on the power-receiving side (the antenna on the power-receiving side) or the like, it is necessary to broaden the range of the input voltage of the DCDC converter (the Buck-Boost portion). As a result, a problem rises that the efficiency of the DCDC converter (the Buck-Boost portion) is deteriorated. In addition, when the voltage output from the rectifier portion is decreased due to the position deviation or the like, the transmission current flowing through the coil on the power-transmitting side has to be increased. However, if the transmission current exceeds the predetermined maximum current value at that time, problems rise that the load on the circuit elements will be increased and parts such as the coil will be at a high temperature.

SUMMARY

Therefore, the present invention aims to provide a contactless power transmission circuit which is capable of narrowing the fluctuation extent of the direct voltage obtained by rectifying the alternating voltage generated in the power receiving coil. Further, the present invention aims to provide a contactless per transmission circuit which can maintain the transmission current flowing through the power transmitting coil at a predetermined maximum current value when the voltage output from the rectifier portion is decreased due to the position deviation or the like.

In order to solve the problem mentioned above, the contactless power transmission circuit of the present invention is a contactless power transmission circuit for transmitting, a power via a magnetic field from a power transmitting coil to a power receiving coil, wherein comprising a driving circuit for supplying an alternating voltage to the power transmitting coil, a rectifier circuit for rectifying a voltage generated in the power receiving coil with the magnetic field generated by the power transmitting coil, a transmission current detecting circuit for detecting a transmission current flowing through the power transmitting coil, an output voltage detecting circuit for detecting an output voltage of the rectifier circuit, and a control circuit for controlling a period of the alternating voltage output from the driving circuit, wherein the control circuit is set to calculate a first command value and a second command value which are the command values for the period of the alternating voltage and then use a smaller one of either of the first command value and the second command value as a command value for the period of the alternating voltage, wherein the first command value is a command value based on a difference between a detected value of the output voltage detected by the output voltage detecting circuit and a target value of the output voltage, wherein the second command value is a command value calculated based on a difference between a detected value of the transmission current detected by the transmission current detecting circuit and a target value of the transmission current.

In the contactless power transmission circuit, the output voltage of the rectifier circuit can be limited to a voltage value below the target value. Further, when the output voltage of the rectifier circuit cannot be increased to the target value of the output voltage, the transmission current is controlled so that the transmission current flowing through the power transmitting coil is maintained at the target value of the transmission current. In addition, the target value of the transmission current is set by considering, for example, a maximum rating of the circuit elements.

Preferably, the target value of the transmission current is set to a maximum allowable current value of the power transmitting coil.

As such, when a coupling coefficient of the power transmitting coil Lt and the power receiving coil Lr is decreased, the transmission current flowing through the power transmitting coil Lt is maintained at the maximum allowable current value of the power transmitting coil Lt.

Preferably, further comprising an output current detecting circuit for detecting an output current of the rectifier circuit, wherein the control circuit sets the target value of the output voltage based on a detected value of the output current which is detected by the output current detecting circuit and then calculates the first command value using this target value.

In this way, the target value of the output voltage can be adjusted based on the output current of the rectifier circuit.

Preferably, when the output current of the rectifier circuit exceeds a predetermined current value, the target value of the output voltage is set in such a way that an output power of the rectifier circuit is at a certain value or the output current of the rectifier circuit is at a certain value.

As such, an output characteristic of the rectifier circuit is set as a better one.

The contactless power transmission circuit of the present invention is a contactless power transmission circuit for transmitting a power via a magnetic field from a power transmitting coil to a power receiving coil, wherein comprising a driving circuit for supplying an alternating voltage to the power transmitting coil, a rectifier circuit for rectifying a voltage generated in the power receiving coil via the magnetic field generated by the power transmitting coil, a transmission current detecting circuit for detecting a transmission current flowing through the power transmitting coil, an output voltage detecting circuit for detecting an output voltage of the rectifier circuit, and a control circuit for controlling a period of the alternating voltage output from the driving circuit, wherein the control circuit comprises a target voltage setter for outputting a target value of the output voltage, to target current setter for outputting to target value of the transmission current, a first subtracter for subtracting an output of the output voltage detecting circuit from an output of the target voltage setter, a second subtracter for subtracting an output of the transmission current detecting circuit from an output of the target current setter, a first PFM controller which is connected to an output of the first subtracter and outputs a first command value (i.e., the command value for the period of the alternating voltage), a second PFM controller which is connected to an output of the second subtracter and outputs a second command value (i.e., the command value for the period of the alternating voltage), a comparator which connects an output of the first PFM controller to an inverted input and connects an output of the second PFM controller to a non-inverted input, a multiplexer which connects the output of the first PFM controller and the output of the second PFM controller to an input and connects an output of the comparator to a selection control input, wherein the multiplexer is set to select the output of the first PFM controller when the output of the comparator is a high level and to select the output of the second PFM controller when the output of the comparator is a low level.

In the contactless power transmission circuit, the output voltage of the rectifier circuit can be limited to a voltage value below the target value. In addition, when the output voltage of the rectifier circuit cannot be increased to the target value of the output voltage, the transmission current is controlled so that the transmission current flowing through the power transmitting coil is maintained at the target value of the transmission current. Further, the target value of the transmission current is set by considering, for example, a maximum rating of the circuit element.

It is preferable that the target current setter outputs a maximum allowable current of the power transmitting coil as the target value of the transmission current. As such, when a coupling coefficient of the power transmitting coil Lt and the power receiving coil Lt becomes smaller, the transmission current flowing through the power transmitting coil Lt is maintained at the maximum allowable current value of the power transmitting coil Lt.

Preferably, further comprising an output current detecting circuit for detecting an output current of the rectifier circuit, wherein the target current setter outputs a target value of the output voltage based on a detected value of the output current which is detected by the output current detecting circuit. As such, the target value of the output voltage can be adjusted based on the output current of the rectifier circuit.

Preferably, when the output current of the rectifier circuit exceeds a predetermined current value, the target voltage setter adjusts and then outputs the target value of the output voltage in such a way that an output power of the rectifier circuit is at a certain value or the output current of the rectifier circuit is at a certain value. As such, an output characteristic of the rectifier circuit is set as a better one.

According to the contactless power transmission circuit of the present invention, it is capable of narrowing, a fluctuation extent of an output voltage of the rectifier circuit, wherein the rectifier circuit outputs a direct voltage obtained by rectifying an alternating voltage generated in the power receiving coil. In other words, in the contactless power transmission circuit, the output voltage of the rectifier circuit can be restricted to a voltage value below a target value. In addition, when the output voltage of the rectifier circuit cannot be increased to the target value of the output voltage a transmission current flowing through the power transmitting coil is maintained at a predetermined maximum current value, so the fluctuation extent is also inhibited when the output voltage is decreased.

DESCRIPTION OF REFERENCE NUMERALS

Figure 1:
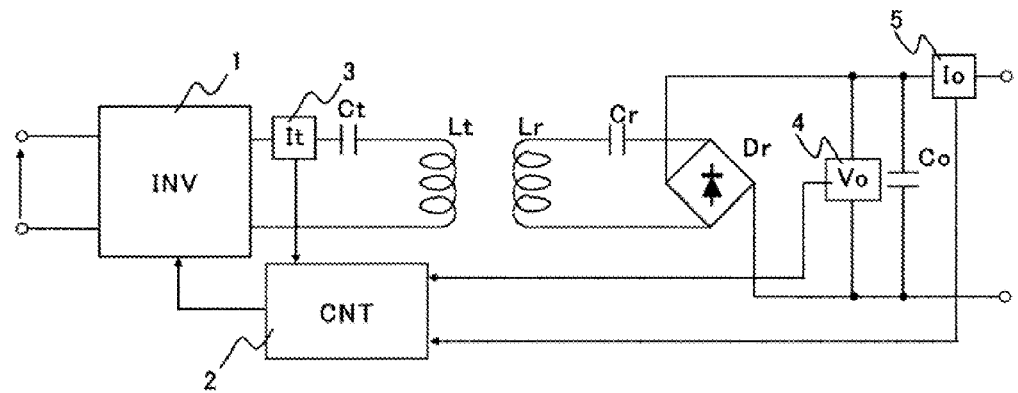
FIG. 1 is a schematic block diagram showing the configuration of the contactless power transmission circuit.

1. a driving circuit (the inverter)
2. a control circuit
3. a transmission current detecting circuit
4. an output voltage detecting circuit
5. an output current detecting circuit
10. a target voltage setter
11. a subtracter
12. a first PFM controller
13. a subtracter
14. a second PFM controller
15. a multiplexer
16. a comparator
17. a target current setter

DETAILED DESCRIPTION OF EMBODIMENTS

The embodiments for carrying out the present invention will be described with reference to the drawings. However, the present invention is not limited to the content described in these embodiments. In addition, the same reference numeral refers to the same element or an element having the same function, and repeated descriptions will be omitted in the description.

FIG. 1 is a schematic block diagram showing an example of the embodiment of the contactless power transmission circuit in the present invention. Further, in this block diagram only the principle portions of the contactless power transmission circuit is shown which are necessary for the description of the characteristics of the present invention.

In the contactless power transmission circuit, the power is transmitted from a power transmitting coil Lt to a power receiving coil Lr via a magnetic field generated by the power transmitting coil Lt. A condenser Ct for resonance is connected to the power transmitting coil Lt and forms a resonance circuit together with the power transmitting coil Lt. Similarly, a condenser Cr for resonance is connected to the power receiving coil Lr and forms a resonance circuit together with the power receiving coil Lr. However, the condenser Ct for resonance and the condenser Cr for resonance are not the necessary constituent elements in the present invention.

The driving circuit (the inverter circuit) 1 is a circuit for providing an alternating voltage to the power transmitting coil Lt, and the input voltage Vin is changed to an alternating voltage. The power transmitting coil Lt generates a magnetic field via the current (the transmission current) which flows through the power transmitting coil Lt based on this alternating voltage. The driving circuit (the inverter circuit) 1 can be a full bridge circuit, a half bridge circuit, a push-pull circuit or the like. Further, the current value of the transmission current flowing through the power transmitting cod Lt is detected by the transmission current detecting circuit 3. The detected value (the current value) detected by the transmission current detecting circuit 3 can be the peak value of the transmission current and can also be a virtual value.

The alternating voltage generated in the power receiving coil Lr via the magnetic field generated by the power transmitting coil Lt is subjected to a full-wave rectifier by a bridge diode Dr and is then stabilized by a condenser Co for stabilization. In other words, in this case, the rectifier circuit is composed of the bridge diode Dr and the condenser Co for stabilization. The output voltage of the rectifier circuit (i.e., the voltage between two ends of the condenser Co for stabilization) is detected by the output voltage detecting circuit 4. In addition, the output current of the rectifier circuit (i.e., the current supplied from the rectifier circuit to the load side) is detected by the output current detecting, circuit 5.

The control circuit 2 controls the operation of the driving circuit (the inverter circuit) 1. Such a control is the so called control of the pulse frequency modulation and controls the period of the alternating voltage output from the driving circuit (the inverter circuit) 1. The period of the alternating voltage is controlled based on the detected values of the transmission current detecting circuit 3, the output voltage detecting circuit 4 and the output current detecting circuit 5. Further, the period of the alternating voltage is controlled in such a way that the transmission current flowing through the power transmitting coil Lt is close to the target value or the output voltage of the rectifier circuit is close to the target value. In addition, the period of the alternating voltage output from the driving, circuit (the inverter circuit) 1 is controlled to be within a smaller range than that corresponding to the resonance frequency of the resonance circuit which is composed of the power transmitting coil Lt and the condenser Ct for resonance. That is, the frequency of the alternating voltage is controlled in a range (the inductive region) larger than the resonance frequency of the resonance circuit composed of the power transmitting coil Lt and the condenser Ct for resonance. in such a range, if the frequency is decreased, i.e., if the period is increased, the detected values of the output voltage detecting circuit 4 and the output current detecting circuit 5 will be increased.

Figure 2:
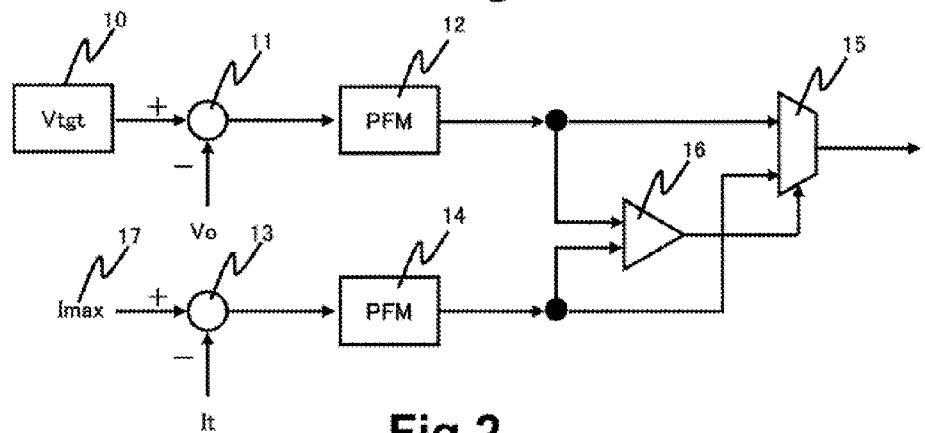
FIG. 2 is a schematic block diagram showing, the configuration of the control circuit in the contactless power transmission circuit.

Hereinafter, the operation of the control circuit 2 will be described with reference to the block diagram shown in FIG. 2. The target voltage setter 10 outputs a target value Vtgt of the output voltage of the rectifier circuit composed of the diode bridge Dr and the condenser Co for stabilization. The first subtracter 11 outputs a value obtained by subtracting the detected value Vo of the output voltage from the target value Vtgt of the output voltage. In other words, the first subtracter 11 subtracts the output of the output voltage detecting circuit 4 from the output of the target voltage setter 10. The first PFM controller 12 is connected to the output of the first subtracter 11 and calculates the first command value (which is the command value related to the period of the alternating voltage output from the driving circuit (the inverter circuit) 1) based on the value output from the first subtracter (the difference between the target value Vtgt and the detected value Vo). That is, the first command value is a value indicating the period which is the control object in the control of pulse frequency modulation. In the calculation of the first command value, the proportional control, the integral control, the differential control or the like can be generally used. That is, the first command value is a value obtained based on the operation amount and calculated in accordance with one element or multiple elements selected from the group consisting of the proportional element, the integral element and the differential element. in addition, the gain value to multiply each of the proportional element, the integral element and the differential element can be properly set.

The target current setter 17 outputs the target value Imax of the transmission current. The second subtracter 13 outputs a value obtained by subtracting the detected value It of the transmission current from the target value Imax of the transmission current. In other words, the second subtracter 13 subtracts the output of the output current detecting circuit 5 from the output of the target current setter 17. The second PFM controller 14 is connected to the output of the second subtracter 13 and calculates the second command value the command value related to the period of the alternating voltage output from the driving circuit (the inverter circuit) 1) based on the value output from the second subtracter 13 (the difference between the target value Imax and the detected value It). That is, the second command value, as the same as the first command value, is a value indicating the period which is the control object in the control of pulse frequency modulation. In the calculation of the second command value, as the same as that of the first command value, the proportional control, the integral control, the differential control or the like can be generally used. Further, with respect to the target value of the transmission current Imax, the target value Imax of the transmission current is set as, for example, the maximum allowable current value of the power transmitting coil Lt.

The first command value and the second command value are input to the multiplexer 15 and also to the comparator 16. The multiplexer 15 selectively outputs one of either of the first command value and the second command value based on the output signal of the comparator 16. In the present embodiment, the output of the first PFM controller 12 is connected to the inverted input of the comparator 16, and the output of the second PFM controller 14 is connected to the non-inverted input of the comparator 16. In addition, in the present embodiment, the output of the first PFM controller 12 and the output of the second PFM controller 14 are connected to the input of the multiplexer 15, and the output of the comparator 16 is connected to the selection control input of the multiplexer 15. The comparator 16 is set to Output a signal of a high level when the first command value is smaller than the second command value and to output a signal of a low level when the first command value is larger than the second command value. Further, the multiplexer 15 is set to output the first command value when the output signal of the comparator 16 is a high level and to output the second command value when the output signal of the comparator 16 is a low level. In other words, the multiplexer 15 is set to select the output of the first PFM controller 12 when the output of the comparator 16 is a high level and to select the second PFM controller 14 when the output of the comparator 16 is a low level. Accordingly, the multiplexer 15 outputs the first command value when the first command value is smaller than the second command value, and outputs the second command value when the second command value is smaller than the first command value.

The control circuit 2 controls the period of the alternating voltage output from the driving circuit (the inverter circuit) 1 in accordance with the command value output from the multiplexer 15 (the first command value or the second command value). In this way, when the first command value is output from the multiplexer 15, the control circuit 2 controls the period of the alternating voltage in such a way that the output voltage of the rectifier circuit is consistent with the target value Vtgt. Further, when the second command value is output from the multiplexer 15, the control circuit 2 controls the period of the alternating voltage to make the transmission current to be consistent with the target value Imax. At that time, if the target value Imax of the transmission current is set as the maximum allowable current value of the power transmitting coil Lt, the transmission current will be maintained at the maximum allowable current value.

Figure 3:
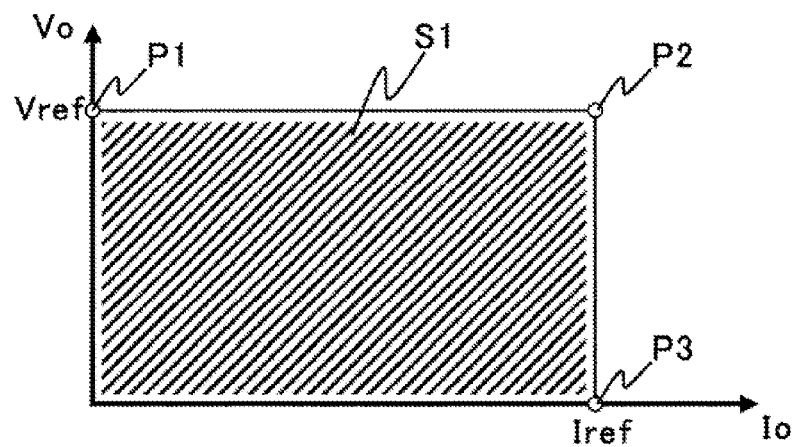
FIG. 3 is a schematic graph showing the fluctuation extent of the output voltage and the output current from the rectifier circuit in the contactless power transmission circuit.
Figure 4:
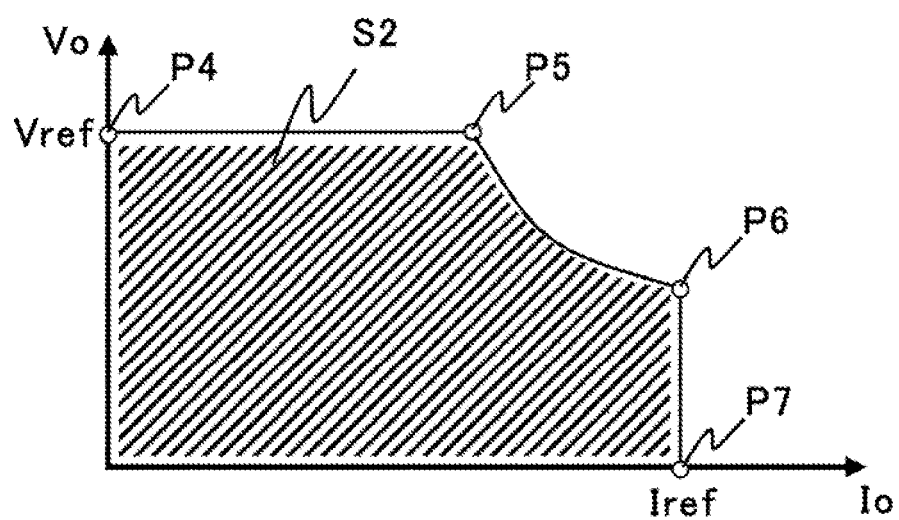
FIG. 4 is a schematic graph showing the fluctuation extent of the output voltage and the output current from the rectifier circuit in the contactless power transmission circuit.

Next, the fluctuation extent of the output voltage and the output current from the rectifier circuit composed of the diode bridge Dr and the condenser Co for stabilization will be described with reference to FIG. 3 and FIG. 4. The target value Imax of the transmission current is set as the maximum allowable current value of the power transmitting coil Lt. That is, the target current setter 17 outputs the maximum allowable current value of the power transmitting coil Lt as the target value Imax of the transmission current.

First of all, the fluctuation extent of the output voltage and the output current of the rectifier circuit will be described with reference to FIG. 3. When the position deviation of the power transmitting coil Lt and the power receiving coil Lr is small and the coupling coefficient of the power transmitting coil Lt and the power receiving coil Lr is relatively large, the output voltage of the rectifier circuit will be maintained at the Vref which is the target value Vtgt. Accordingly, the point P decided by the output voltage and the output current of the rectifier circuit changes in a line from the point P1 to the point P2. At this time, the control circuit 2 controls the period of the alternating voltage output from the driving circuit (the inverter circuit) 1 in accordance with the first command value. That is, the period of the alternating voltage is controlled according to the first command value so that the maximum value of the output voltage from the rectifier circuit becomes the Vref and the output voltage of the rectifier circuit will not exceed the Vref.

When the position deviation of the power transmitting coil Lt and the power receiving coil Lr is large and the coupling coefficient of the power transmitting coil Lt and the power receiving coil Lr is relatively small, the output voltage of the rectifier circuit becomes lower than the Vref which is the target value Vtgt. Accordingly, the point P decided by the output voltage and the output current of the rectifier circuit changes in the range S1 (the part with oblique lines) surrounded by the line from the point P1 to the point P2 and the line from the point P2 to the point P3. At this time, the control circuit 2 controls the period of the alternating voltage output from the driving circuit (the inverter circuit) 1 in accordance with the second command value. Also at that time, as the transmission current flowing through the power transmitting coil Lt is maintained at the target value Imax, the decrease of the output voltage of the rectifier circuit will be inhibited to the minimum.

When the output current of the rectifier circuit reaches the current value Iref, the target value Vtgt of the output voltage will be adjusted in such a way that the output voltage of the rectifier circuit will change in the line from the point P2 to the point P3. That is, the target voltage setter sets the target value Vtgt in such a way that the point P decided by the output voltage and the output current of the rectifier circuit becomes a point present in the line. Further, the control circuit 2 controls the period of the alternating voltage output from the driving circuit (the inverter circuit) 1 in accordance with the first command value which is based on the setting value of the target value Vtgt.

Next, the fluctuation extent of the output voltage and the output current from the rectifier circuit will be described with reference to FIG. 4. When the position deviation of the power transmitting coil Lt and the power receiving coil Lr is small and the coupling coefficient of the power transmitting coil Lt and the power receiving coil Lr is relatively large, the output voltage of the rectifier circuit will be maintained at the Vref which is the target value Vtgt. Accordingly, the point P decided by the output voltage and the output current of the rectifier circuit changes in a line from the point P4 to the point P5. At this time, the control circuit 2 controls the period of the alternating voltage output from the driving circuit (the inverter circuit) 1 in accordance with the first command value.

When the output current of the rectifier reaches the current value Iref, the target value Vtgt of the output voltage will be set in such a way that the output voltage of the rectifier circuit will change in the curve from the point P5 to the point P6. When the target value Vtgt of the output voltage changes on the curve from the point P5 to the point P6, the target value Vtgt of the output voltage will be adjusted in such a way that the power output from the rectifier circuit will be maintained at a certain value. Further, when the output current of the rectifier circuit reaches the current value Imax, the target value Vtgt of the output voltage will be set in such a way that the output voltage of the rectifier circuit will change in the line from the point P6 to the point P7. When the target value Vtgt of the output voltage changes on the line from the point P6 to the point P7, the target value Vtgt of the output voltage will be adjusted in such a way that the output current of the rectifier circuit will be maintained at the current value Imax. Further, the control circuit 2 controls the period of the alternating voltage output from the driving circuit (the inverter circuit) 1 in accordance with the first command value which is based on the setting value of the target value Vtgt.

When the position deviation of the power transmitting coil Lt and the power receiving cod Lr is large and the coupling coefficient of the power transmitting coil Lt and the power receiving coil Lr is relatively small, the point P decided by the output voltage and the output current from the rectifier circuit will vary in the range S2 (the part with oblique lines) surrounded by the line from the point P4 to the point P5, the curve from the point P5 to the point P6 and the line from the point P6 to the point P7. At that time, the control circuit 2 controls the period of the alternating voltage output from the driving circuit (the inverter circuit) 1 in accordance with the second command value.

Although the embodiments of the contactless power transmission circuit in the present invention have been described above, the present invention is not limited to these embodiments. Various modifications can be applied without departing from the spirit of the present invention.

What is claimed is:

1. A contactless power transmission circuit for transmitting a power via a magnetic field from a power transmitting coil to a power receiving coil, comprising:
   a driving circuit for supplying an alternating voltage to the power transmitting coil, a rectifier circuit for rectifying a voltage generated in the power receiving coil with a magnetic field generated by the power transmitting coil,
a transmission current detecting circuit for detecting a transmission current flowing through the power transmitting coil,
an output voltage detecting circuit for detecting an output voltage of the rectifier circuit, and
a control circuit for controlling a period of the alternating voltage output from the driving circuit,
wherein the control circuit is set to calculate a first command value and a second command value which are command values for the period of the alternating voltage, and use a smaller one of either of the first command value and the second command value as a command value for the period of the alternating voltage,
the first command value is a command value based on a difference between a detected value of the output voltage detected by the output voltage detecting circuit and a target value of the output voltage, and the second command value is a command value calculated based on a difference between a detected value of the transmission current detected by the transmission current detecting circuit and a target value of the transmission current.

2. The contactless power transmission circuit of claim 1, wherein, the target value of the transmission current is set to a maximum allowable current value of the power transmitting coil.

3. The contactless power transmission circuit of claim 1, further comprising:
an output current detecting circuit for detecting an output current of the rectifier circuit,
wherein the control circuit sets a target value of the output voltage based on a detected value of the output current which is detected by the output current detecting circuit and uses the target value to calculate the first command value.

4. The contactless power transmission circuit of claim 3, wherein,
when the output current of the rectifier circuit exceeds a predetermined current value, the target value of the output voltage is set in such a way that an output power of the rectifier circuit is at a certain value or the output current of the rectifier circuit is at a certain value.

5. The contactless power transmission circuit of claim 2, further comprising:
an output current detecting circuit for detecting an output current of the rectifier circuit,
wherein the control circuit sets a target value of the output voltage based on a detected value of the output current which is detected by the output current detecting circuit and uses the target value to calculate the first command value.

6. A contactless power transmission circuit for transmitting a power via a magnetic field from a power transmitting coil to a power receiving coil,
comprising:
a driving circuit for supplying an alternating voltage to the power transmitting coil,
a rectifier circuit for rectifying a voltage generated in the power receiving coil with a magnetic field generated by the power transmitting coil,
a transmission current detecting circuit for detecting a transmission current flowing through the power transmitting coil,
an output voltage detecting circuit for detecting an output voltage of the rectifier circuit, and
a control circuit for controlling a period of the alternating voltage output from the driving circuit,
wherein the control circuit comprises
a target voltage setter for outputting a target value of the output voltage,
a target current setter for outputting a target value of the transmission current,
a first subtracter for subtracting an output of the output voltage detecting circuit from an output of the target voltage setter,
a second subtracter for subtracting an output of the transmission current detecting circuit from an output of the target current setter,
a first PFM controller which is connected to an output of the first subtracter and outputs a first command value which is a command value for the period of the alternating voltage,
a second PFM controller which is connected to an output of the second subtracter and outputs a second command value which is a command value for the period of the alternating voltage,
a comparator which connects an output of the first PFM controller to an inverted input and connects an output of the second PFM controller to a non-inverted input,
a multiplexer which connects the output of the first PFM controller and the output of the second PFM controller to an input and connects an output of the comparator to a selection control input,
wherein the multiplexer is set to select the output of the first PFM controller when the output of the comparator is a high level, and to select the output of the second PFM controller when the output of the comparator is a low level.

7. The contactless power transmission circuit of claim 6, wherein, the target current setter outputs a maximum allowable current value of the power transmitting coil as the target value of the transmission current.

8. The contactless power transmission circuit of claim 6, further comprising:
an output current detecting circuit for detecting an output current of the rectifier circuit,
wherein the target voltage setter outputs the target value of the output voltage based on a detected value of the output current which is detected by the output current detecting circuit.

9. The contactless power transmission circuit of claim 8, wherein,
when the output current of the rectifier circuit exceeds a predetermined current value, the target voltage setter adjusts and outputs the target value of the output voltage in such a way that an output power of the rectifier circuit is at a certain value or a way that the output current of the rectifier circuit is at a certain value.

10. The contactless power transmission circuit of claim 7, further comprising:
an output current detecting circuit for detecting an output current of the rectifier circuit,
wherein the target voltage setter outputs the target value of the output voltage based on a detected value of the output current which is detected by the output current detecting circuit.

* * * * *